July 24, 1956

C. F. THIXTON 2,756,062

COMBINE LEVELLER

Filed Feb. 28, 1955

Clyde F. Thixton
INVENTOR.

BY *Clarence A. O'Brien*
*and Harvey B. Jacobson*
Attorneys

Clyde F. Thixton
INVENTOR.

July 24, 1956  C. F. THIXTON  2,756,062
COMBINE LEVELLER

Filed Feb. 28, 1955  4 Sheets-Sheet 3

Clyde F. Thixton
INVENTOR.

BY Clarence A. O'Brien
and Harvey B. Jacobson
Attorneys

July 24, 1956   C. F. THIXTON   2,756,062
COMBINE LEVELLER

Filed Feb. 28, 1955   4 Sheets-Sheet 4

Clyde F. Thixton
INVENTOR.

BY Clarence A. O'Brien
and Harvey B. Jacobson
Attorneys

United States Patent Office 2,756,062
Patented July 24, 1956

2,756,062

COMBINE LEVELLER

Clyde F. Thixton, Paso Robles, Calif.

Application February 28, 1955, Serial No. 491,005

8 Claims. (Cl. 280—6)

This invention relates in general to new and useful improvements relative to combines, and more specifically, to an automatic control unit for combine levellers.

At the present time, there is on the market a combine provided with a levelling mechanism for use in side-hill and other sloping operations. The levelling mechanism is in the form of a pair of front wheels, the drive wheels of the combine, which are carried by arms pivotally mounted with respect to the frame. The arms are moved to and retained in selected positions through the means of fluid motors. The fluid motors are connected to a pressurized fluid source through the use of a control valve. At the present time, by selectively actuating the control valve, the wheels of the combine may be raised and lowered, as desired, in order to retain the combine on an even keel when working on a side-hill or the like. However, the manual control is inconvenient inasmuch as it requires much time and attention on the part of the operator of the combine in order to retain the combine in a level position at all times.

It is therefore the primary object of this invention to provide an automatic control unit for operating the valve of the combine leveller in order that the combine may be automatically retained in a level condition at all times.

Another object of this invention is to provide an automatic control unit for operating the valve of a combine levelling mechanism, the control unit utilizing a pendulum controlled electrical mechanism, with the electric circuit to the various parts of the mechanism being energized upon the swinging of the pendulum past offcenter points in response to the tilting of the combine proper.

Still another object of this invention is to provide a pendulum actuated switch mechanism which includes a pair of opposed switches which are aligned with a striker member of a pendulum, the striker member engaging and actuating the switches in response to swinging of the pendulum.

A further object of this invention is to provide an improved pendulum actuator incorporating dampening means, the pendulum actuator being in the form of a pendulum rod having a weight carried by the lower portion thereof and being pivotally mounted, the pendulum rod being connected to a pair of oppositely facing pistons which are disposed in opposed cylinders, the cylinders being submerged in a fluid and having limited access openings whereby the flow of fluid in and out of the cylinders in response to reciprocatory movement of the pistons is restricted.

A still further object of this invention is to provide an improved automatic control unit for a valve, the automatic control unit including a control arm having connected thereto a pair of opposed electromagnetic members, the electromagnetic members being selectively energized through a relay system whose operation is controlled by a pair of pendulum actuated switches.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 8:
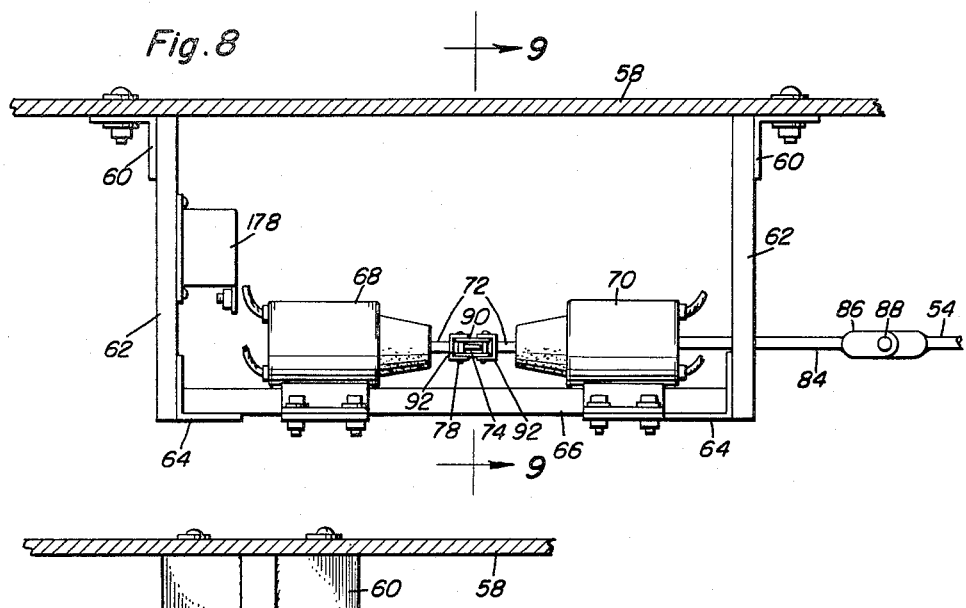
Figure 9:
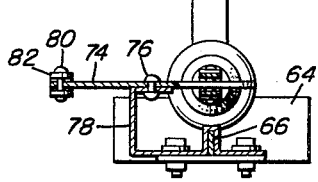

Figure 8 is an enlarged fragmentary sectional view taken through a portion of the combine and shows in side elevation the electromagnetic means for operating the valve of the levelling mechanism; and Figure 9 is an enlarged fragmentary vertical sectional view taken substantially upon the plane indicated by the section line 9—9 of Figure 8 and shows further the relationship between one of the electromagnetic members and a control arm for the valve.

Figure 1:
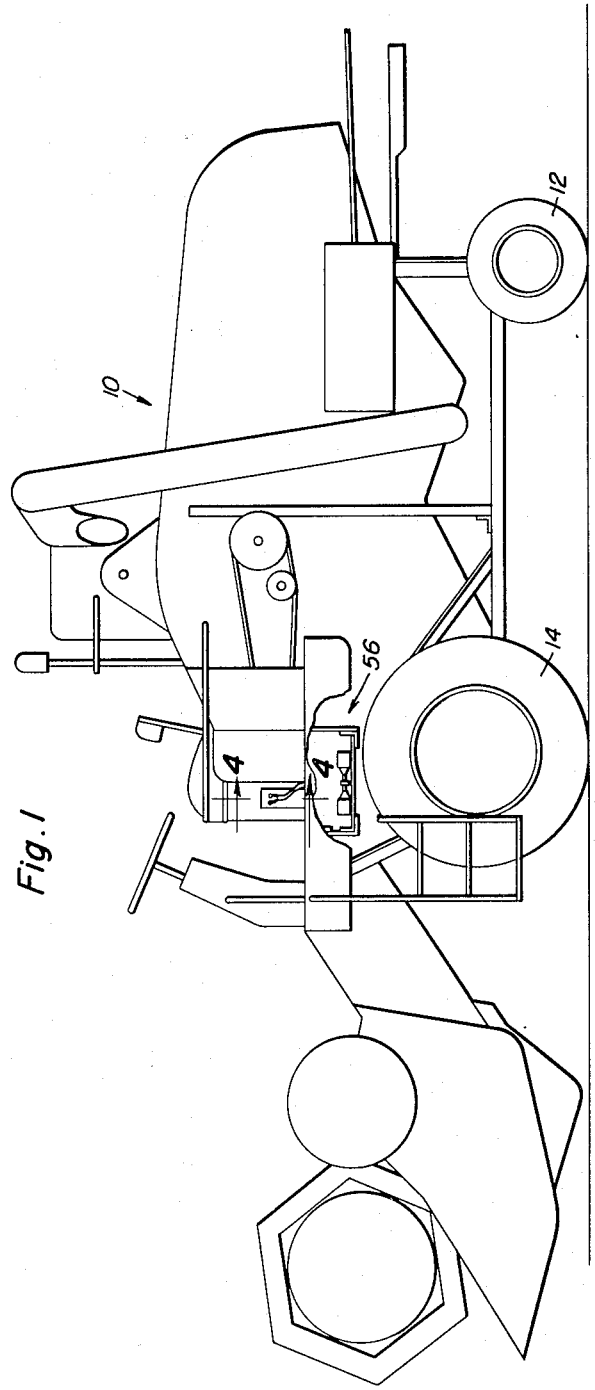
Figure 1 is a side elevational view of the combine now on the market incorporating the levelling mechanism, the combine being provided with the automatic control unit which is the subject of this invention.

Referring now to the drawings in detail, it will be seen that there is illustrated in Figure 1 a combine which is referred to in general by the reference numeral 10. The combine 10 is supported by a pair of relatively fixed rear wheels 12 and a pair of vertically adjustable front driving wheels 14.

Figure 2:
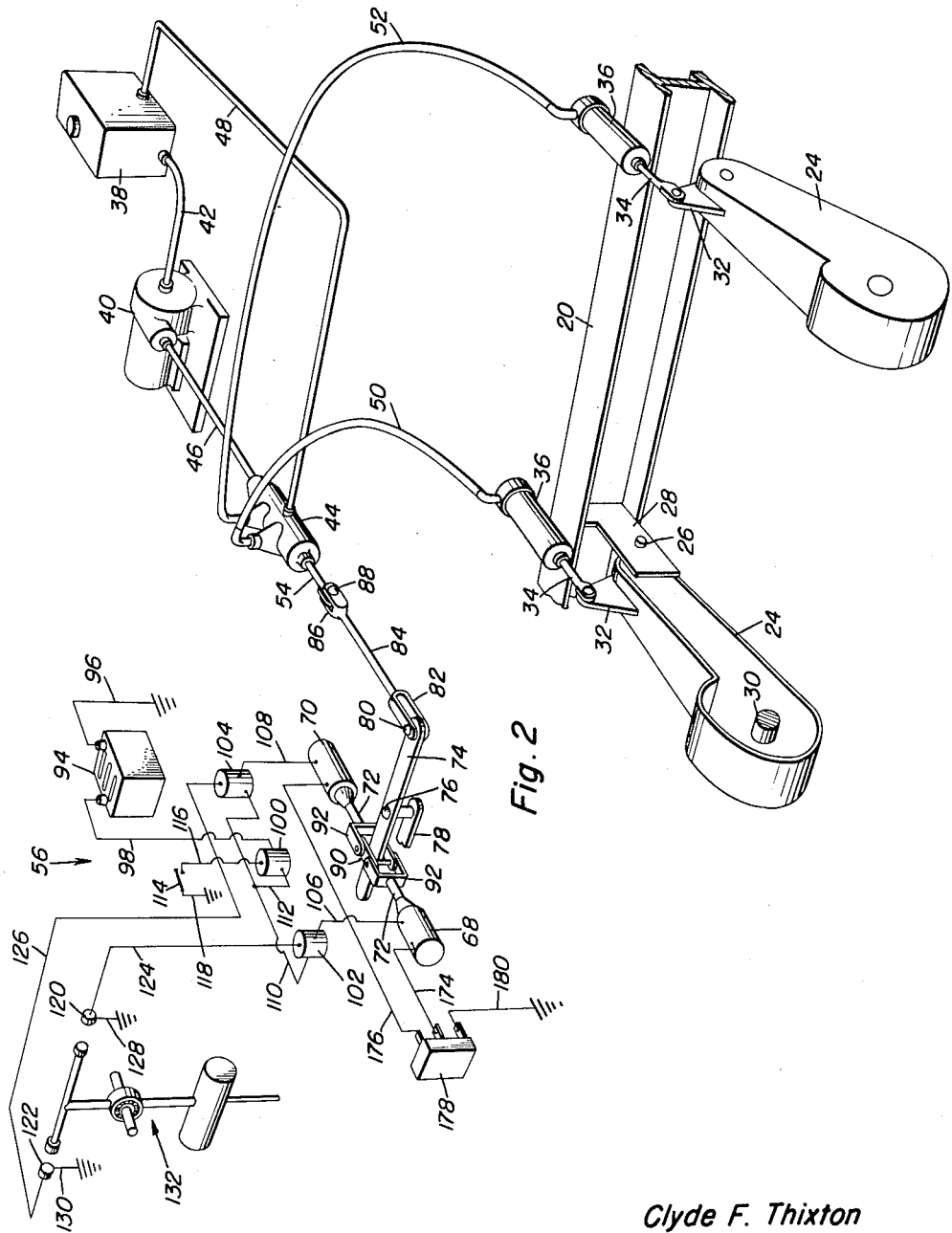
Figure 2 is a schematic view with portions shown in perspective of both the levelling mechanism of the original combine and the automatic control unit for automatically operating the levelling mechanism.
Figure 3:
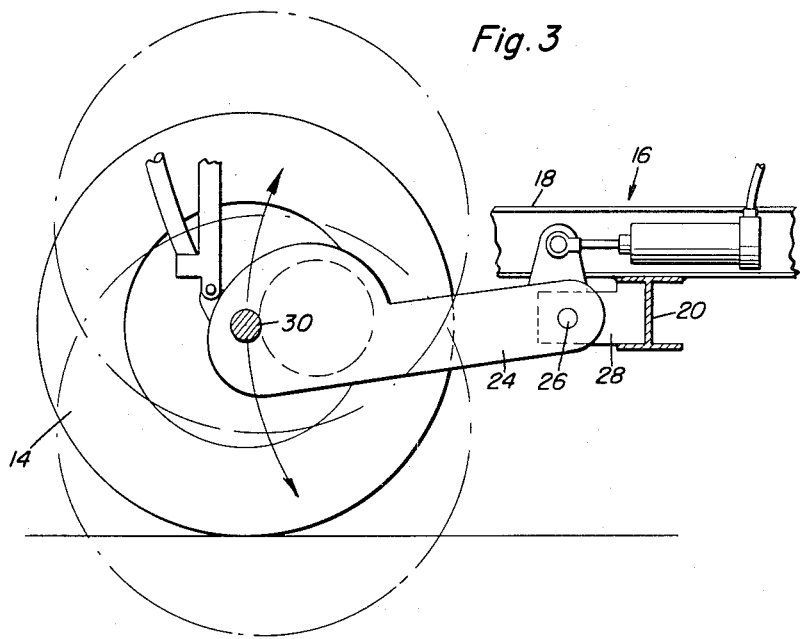
Figure 3 is an enlarged fragmentary sectional view taken through the combine of Figure 1 and shows the manner in which one of the front driving wheels thereof is carried by a pivotally mounted arm for selected vertical positioning whereby the combine may be raised and lowered, as desired, to effect levelling thereof.
Figure 4:
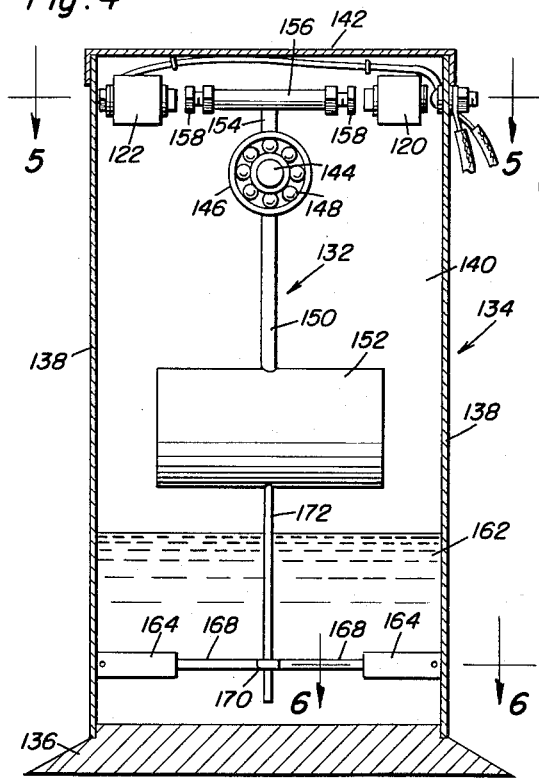
Figure 4 is a vertical sectional view taken through a pendulum actuated control switch mechanism which is a major feature of this invention and shows the general details thereof.

As is best illustrated in Figures 2 and 3, the combine 10 includes a frame which is referred to in general by the reference numeral 16 and is formed of spaced frame rails 18. Extending between the frame rails 18 adjacent the forward ends thereof is a transverse frame member 20. Carried by the transverse frame member 20 in transversely spaced relation is a pair of support arms 24 which are pivotally mounted on pivot pins 26 carried by brackets 28 which are rigidly secured to the transverse frame member 20.

The forward ends of the support arms 24 are provided with suitable axles 30 which may have connected thereto suitable drive mechanism of the combine 10, as well as brake means. However, the drive mechanism and the brake means are not illustrated inasmuch as they form no part of this invention. Mounted on the axles 30 are the front drive wheels 14.

Extending upwardly from the rear portions of the support arms 24 are plates 32 which have connected thereto piston rods 34 of fluid motors 36. By extending the piston rods 34 or retracting them, as desired, it will be readily apparent that the wheels 14 may be raised and lowered with respect to the frame 16 and the combine 10 so as to level the combine 10 when operating on a side-hill slope or the like.

In order that the fluid motors 36 may be selectively operated, there is provided a fluid reservoir 38 which has connected thereto a fluid pump 40. The fluid pump 40 is connected to the reservoir 38 by means of a suitable fluid line 42. It is to be understood that the fluid pump 40 will be driven in any desired manner from the drive mechanism of the combine 10.

There is also provided a flow control valve 44 which is connected to the fluid pump 40 by a fluid line 46 and to the reservoir 38 by a return line 48. The flow control valve 44 is connected to the two fluid motors 36 by suitable lines 50 and 52.

The flow control valve 44 includes a valve rod 54 which, on the original form of the combine 10, is manually controllable in order to selectively raise one of the front drive wheels 14 and lower the other simultaneously in order to level the combine with respect to the side-hill slope on which it is operating. However, inasmuch as the slope on a side-hill field will vary along the hill, it is necessary for the operator to keep manipulating the valve 44 in order that the combine 10 may be retained in a horizontal position at all times.

In order to effect automatic levelling of the combine 10, there is provided the automatic control unit which is the subject of this invention, the control unit being referred to in general by the reference numeral 56. As is best illustrated in Figure 1, the control unit 56 is mounted in the forward portion of the combine 10 above the front wheels 14 thereof.

Referring now to Figure 8 in particular, it will be seen that there is illustrated a floor board 58 of the combine 10. Secured to the underside of the floorboard 58 by means of suitable brackets 60 is a pair of hangers 62. The hangers 62 have carried at the lower ends thereof opposed angle members 64 which have extending therebetween and supported thereon a rail 66.

Mounted on the rails 66 in spaced relation is a pair of electromagnetic members 68 and 70. The electromagnetic members 68 and 70 are identical, and each includes an actuator rod 72.

Disposed between the actuator rods 72 is a control arm 74 which is carried by a pivot pin 76 supported by a bracket 78 clamped to the rail 66. The control arm 74, as is best illustrated in Figure 2, has pivotally connected to one end thereof by means of a pivot pin 80, a bifurcated end 82 of a link 84. The opposite end of the link 84 includes a bifurcated portion 86 which is connected to the valve rod 80 by a pin 88.

The opposite end of the control arm 74 is received in a box-like link 90 to which is connected fork members 92 carried by the rods 72.

Referring once again to Figure 2 in particular, it will be seen that the electrical circuit for the automatic control unit 56 includes an ordinary battery 94 which may be in the form of the six-volt battery of the electrical system of the combine 10. One terminal of the battery 94 is grounded by means of a conductor 96. The opposite terminal of the battery 94 has connected thereto a conductor 98 which is connected to one terminal of a suitable relay 100.

The electrical circuit also includes relays 102 and 104 which are connected to first terminals of the electromagnetic members 68 and 70 by means of conductors 106 and 108, respectively. The relays 102 and 104 are also connected together by a conductor 110 which is, in turn, connected to the relay 100 by a conductor 112.

Operation of the relay 100 is effected by a control switch 114 which is connected to the relay 110 by a conductor 116 and to the ground by a conductor 118.

In order that the relays 102 and 104 may be selectively actuated, there is provided a pair of control switches 120 and 122 which are connected to the relays 102 and 104 by conductors 124 and 126, respectively. The switches 120 and 122 are grounded by conductors 128 and 130, respectively. The switches 120 and 122 are selectively actuated by a pendulum actuator which is referred to in general by the reference numeral 132.

Referring now to Figures 4, 5, 6 and 7, it will be seen that there is illustrated a housing which is referred to in general by the reference numeral 134. The housing 134 includes a mounting base 136 which has extending upwardly therefrom end walls 138 and side walls 140. The housing 134 also includes a removable cover 142.

Extending between the side walls 140 adjacent the upper ends thereof is a shaft 144 on which is mounted the pendulum actuator 132. The pendulum actuator 132 includes a hub 146 mounted on the shaft 144 through the use of suitable bearings 148. Secured to the hub 146 and depending therefrom is a pendulum rod 150 which carries at the lower end thereof a relatively heavy weight 152.

Figure 7:
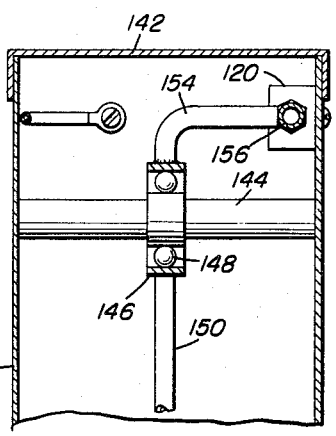
Figure 7 is an enlarged fragmentary sectional view taken substantially upon the plane indicated by the section line 7—7 of Figure 5 and shows the mounting of the pendulum with respect to a cross-shaft.

Also secured to the hub 146 and extending upwardly therefrom is an upper pendulum rod extension 154. The pendulum rod extension 154 is generally L-shaped in elevation, as is best illustrated in Figure 7. Carried by the free end of the extension 154 is a striker member 156. The striker member 156 has carried at opposite ends thereof adjustably mounted striker heads 158 which are aligned with the switches 120 and 122.

Figure 5:
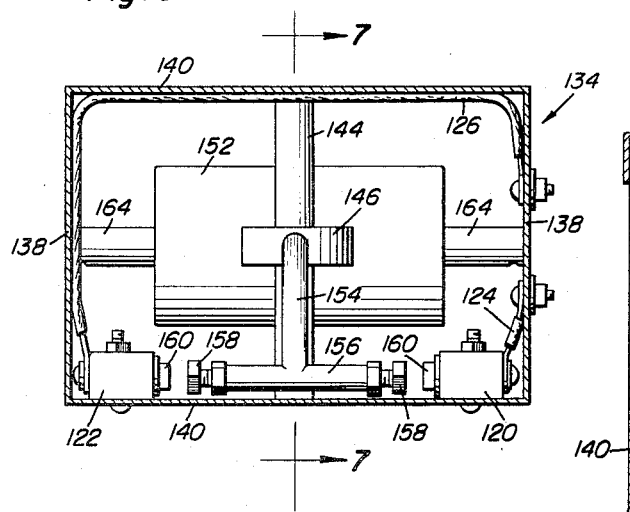
Figure 5 is an enlarged horizontal sectional view taken substantially upon a plane indicated by the section line 5—5 of Figure 4 and shows further the relationship between a striker member carried by the pendulum and switches associated therewith.

As is best illustrated in Figure 5, the switches 120 and 122 are mounted on one of the side walls 140 of the housing 134 in alignment with the striker member 156. The switches 120 and 122 are provided with push-button actuators 160 which are aligned with the striker heads 158 and are depressible thereby in response to swinging movement of the pendulum actuator 132. It is pointed out at this time that the switches 120 and 122 may be grounded, either through the use of the conductors 128 and 130 or by direct grounding to the housing 134.

In order that the swinging of the pendulum actuator 132 may be dampened, there is disposed in the lower portion of the housing 134 a fluid source 162. Carried by the end walls 138 in opposed relation and submerged in the fluid source 162 is a pair of opposed cylinders 164. The cylinders 164 have mounted therein for reciprocatory movement pistons 166 which are connected to piston rods 168. The piston rods 168 are connected to each other through a yoke 170 which receives a lower extension 172 of the pendulum rod 150.

Figure 6:
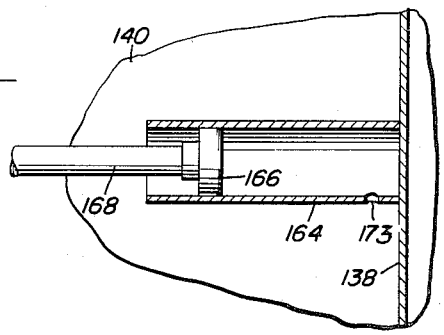
Figure 6 is an enlarged fragmentary sectional view taken substantially upon the plane indicated by the section line 6—6 of Figure 4 and shows the specific details of the dampening means for controlling the rate of swing of the pendulum.

Referring now to Figure 6 in particular, it will be seen that the outer ends of the cylinders 164 are closed by the end walls 138 and that there is formed in the cylinders 164 adjacent the outer ends thereof relatively small openings 173. The openings 173 are of a size to greatly restrict the flow of the fluid 162 in and out of the cylinders 164, thereby controlling the rate at which the pistons 166 may reciprocate with respect to the pistons 164. This, in turn, controls the rate of swinging of the pendulum actuator 132 so that the automatic control unit is not actuated as a result of a temporary unlevelness of the combine when passing over rough or rutted ground.

It is to be understood that the electromagnetic members 68 and 70 are conventional members of the type which include a pulling coil which is relatively heavy, and a holding coil which is relatively light. The two coils may be connected in parallel with the conductors 106 and 108 connected thereto. However, the holding coil will be grounded through the body of the electromagnetic members 68 and 70 whereas the relatively heavy pulling coils of the electromagnetic members 68 and 70 will have connected thereto grounding conductors 174 and 176, respectively. The conductors 174 and 176 are connected to suitable terminals of a circuit breaker 178 which is, in turn, grounded by a conductor 180, thus limiting the time which the pulling coils of the electromagnetic members 68 and 70 are in operation. For the purpose of this invention, it is to be understood that either the electromagnetic members 68 and 70 are to be spring loaded to return the control arm 74 to a neutral position, or the control arm itself is to be spring loaded.

In the operation of the present invention, the automatic control unit is placed into operation by closing the switch 114. This energizes the relay 100 and electrically connects the relays 102 and 104 to the electrical source of the battery 94.

Normally, the control arm 74 is in a neutral position so that the valve 44 is in a neutral position. It is to be understood that initially the wheels 14 are disposed at the same height so that the combine 10 is level. Then, as the combine 10 moves onto sloping ground, the pendulum actuator 132 will swing so that the striking member thereof will engage the control button of one of the switches 120 and 122. Assuming the switch 120 is closed by the swinging of the pendulum actuator 132, it will be seen that the relay 102 is energized and the circuit to the electromagnetic member 68 completed.

Energization of the electromagnetic member 68 will result in the pulling of the control arm 74 towards the electromagnetic member 68, and the resulting movement of the valve rod 54 into the flow control valve 44. This will result in the flow of hydraulic fluid into the fluid motor 36 of the left hand support arm 24, as viewed in Figure 2, and the release of hydraulic fluid from the fluid motor 36 of the right hand support arm 24 so that the left wheel 14, as viewed from the front, will move down and the right wheel 14 will move up, thereby returning the combine to its original level position.

Once the electromagnetic member 68 has been energized, after a short period of time, preferably three seconds, the circuit breaker 178 will open the circuit to the pulling coil thereof, and the plunger rod 72 of the electromagnetic member 68 will be held in place by the holding coil.

Once the combine has reached a level position, the pendulum actuator 132 will move out of engagement with the switch 120 with the result that the circuit to the electromagnetic member 68 will be broken. The control arm 74 will then be returned to its neutral position and the flow control valve 44 moved accordingly.

As the combine 10 moves along the side-hill or other slope that it is operating on, it will be readily apparent that the pendulum actuator 132 will continue actuating the automatic control unit in order to retain the combine level at all times. However, because of the dampening mechanism connected to the pendulum actuator 132, it will be readily apparent that permanent unlevelness of the combine will be taken care of so as to eliminate actuation of the levelling mechanism every time one of the wheels drops into a slight rut or the like.

From the foregoing, it will be readily apparent that there has been devised a suitable automatic control unit which may be attached to existing levelling mechanisms of combines so that the levelling mechanism may be converted from a manually operable one to an automatically operated one.

The foregoing is considered as illustrative only of the principles of the invention. Further, since numerous modifications and changes will readily occur to those skilled in the art, it is not desired to limit the invention to the exact construction and operation as shown and described, and accordingly, all suitable modifications and equivalents may be resorted to, falling within the scope of the appended claims.

What is claimed as new is as follows:

1. An automatic control unit for a valve of a hydraulic levelling system comprising a control arm connectable to the valve, electromagnetic means for selectively moving said control arm in opposite directions, switch means electrically connected to said electromagnetic means for controlling operation thereof, said switch means including a pendulum actuator, said electromagnetic means including a pair of opposed electromagnetic members connected to each other and to said control arm, each of said electromagnetic members including a primary pulling coil and a secondary holding coil, a circuit breaker connected in series with said primary pulling coils.

2. An automatic control unit for a valve of a hydraulic levelling system comprising a control arm connectable to the valve, electromagnetic means for selectively moving said control arm in opposite directions, switch means electrically connected to said electromagnetic means for controlling operation thereof, said switch means including a pendulum actuator, and an electric circuit between said switch means and said electromagnetic means, said electromagnetic means including a pair of opposed electromagnetic members, said electric circuit including an electric power source, a first circuit controlling member controlling the flow of electricity to said electromagnetic members, conductors connecting said electromagnetic members to said circuit controlling member, other circuit controlling members positioned in said conductors, said switch means controlling operation of said other circuit controlling members.

3. An automatic control unit for a valve of a hydraulic levelling system comprising a control arm connectable to the valve, electromagnetic means for selectively moving said control arm in opposite directions, switch means electrically connected to said electromagnetic means for controlling operation thereof, said switch means including a pendulum actuator, and an electric circuit between said switch means and said electromagnetic means, said electromagnetic means including a pair of opposed electromagnetic members, said electric circuit including an electric power source, a first circuit controlling member controlling the flow of electricity to said electromagnetic members, conductors connecting said electromagnetic members to said circuit controlling member, other circuit controlling members positioned in said conductors, said switch means controlling operation of said other circuit controlling members, each of said electromagnetic members including a primary pulling coil and a secondary holding coil, a circuit breaker connected in series with said primary pulling coils.

4. An automatic control unit for a valve of a hydraulic levelling system comprising a control arm connectable to the valve, electromagnetic means for selectively moving said control arm in opposite directions, switch means electrically connected to said electromagnetic means for controlling operation thereof, said switch means including a pendulum actuator, and an electric circuit between said switch means and said electromagnetic means, said electromagnetic means including a pair of opposed electromagnetic members, said electric circuit including an electric power source, a first circuit controlling member controlling the flow of electricity to said electromagnetic members, conductors connecting said electromagnetic members to said circuit controlling member, other circuit controlling members positioned in said conductors, said switch means controlling operation of said other circuit controlling members, said pendulum actuator including a pendulum rod pivotally mounted, a weight carried by a lower portion of said pendulum rod, a striker member carried by said pendulum rod for selectively actuating said switch means.

5. An automatic control unit for a valve of a hydraulic levelling system comprising a control arm connectable to the valve, electromagnetic means for selectively moving said control arm in opposite directions, switch means electrically connected to said electromagnetic means for controlling operation thereof, said switch means including a pendulum actuator, and an electric circuit between said switch means and said electromagnetic means, said electromagnetic means including a pair of opposed electromagnetic members, said electric circuit including an electric power source, a first circuit controlling member controlling the flow of electricity to said electromagnetic members, conductors connecting said electromagnetic members to said circuit controlling member, other circuit controlling members positioned in said conductors, said switch means controlling operation of said other circuit controlling members, said pendulum actuator including a pendulum rod pivotally mounted, a weight carried by a lower portion of said pendulum rod, a striker member carried by said pendulum rod for selectively actuating said switch means, said switch means including a pair of opposed switch members aligned with said striker member for alternate selective engagement by said striker member.

6. An automatic control unit for a valve of a hydraulic levelling system comprising a control arm connectable to the valve, electromagnetic means for selectively moving said control arm in opposite directions, switch means electrically connected to said electromagnetic means for controlling operation thereof, said switch means including a pendulum actuator, and an electric circuit between said switch means and said electromagnetic means, said electromagnetic means including a pair of opposed electromagnetic members, said electric circuit including an electric power source, a first circuit controlling member controlling the flow of electricity to said electromagnetic members, conductors connecting said electromagnetic members to said circuit controlling member, other circuit controlling members positioned in said conductors, said switch means controlling operation of said other circuit controlling members, said pendulum actuator including a pendulum rod pivotally mounted, a weight carried by a lower portion of said pendulum rod, a striker member carried by said pendulum rod for selectively actuating said switch means, a dampening mechanism connected to said pendulum actuator for restricting the speed of swinging thereof, said dampening mechanism including a fluid supply, opposed cylinders mounted within said fluid supply in spaced relation, pistons disposed in said cylinders and connected together and to said pendulum, restricted openings in said cylinders communicating said cylinders with said fluid supply to restrict the speed of movement of said pistons.

7. In combination with a combine levelling mechanism of the type including support wheels carried by pivotally mounted arms, hydraulic motors for positioning said arms, a pressurized fluid supply connected to said motors, and a valve for controlling flow of fluid to said fluid motors, an automatic control unit for said valve comprising a control arm connected to said valve, electromagnetic means for selectively moving said control arm in opposite directions, switch means electrically connected to said electromagnetic means for controlling operation thereof, said switch means including a pendulum actuator, and an electric circuit between said switch means and said electromagnetic means, said electromagnetic means including a pair of opposed electromagnetic members, said electric circuit including an electric power source, a first circuit controlling member controlling the flow of electricity to said electromagnetic members, conductors connecting said electromagnetic members to said circuit controlling member, other circuit controlling members positioned in said conductors, said switch means controlling operation of said other circuit controlling members.

8. In combination with a combine levelling mechanism of the type including support wheels carried by pivotally mounted arms, hydraulic motors for positioning said arms, a pressurized fluid supply connected to said motors, and a valve for controlling flow of fluid to said fluid motors, an automatic control unit for said valve comprising a control arm connected to said valve, electromagnetic means for selectively moving said control arm in opposite directions, switch means electrically connected to said electromagnetic means for controlling operation thereof, said switch means including a pendulum actuator, and an electric circuit between said switch means and said electromagnetic means, said electromagnetic means including a pair of opposed electromagnetic members, said electric circuit including an electric power source, a first circuit controlling member controlling the flow of electricity to said electromagnetic members, conductors connecting said electromagnetic members to said circuit controlling member, other circuit controlling members positioned in said conductors, said switch means controlling operation of said other circuit controlling members, each of said electromagnetic members including a primary pulling coil and a secondary holding coil, a circuit breaker connected in series with said primary pulling coils.

References Cited in the file of this patent

UNITED STATES PATENTS

| | | |
|---|---|---|
| 2,278,081 | Kramer | Mar. 31, 1942 |
| 2,368,268 | Spiegel | Jan. 30, 1945 |
| 2,502,802 | Sievers | Apr. 4, 1950 |
| 2,572,910 | Brown | Oct. 30, 1951 |
| 2,583,250 | Ball | Jan. 22, 1952 |
| 2,684,254 | Goss | July 20, 1954 |
| 2,716,556 | Williams | Aug. 30, 1955 |